(12) United States Patent
Reit et al.

(10) Patent No.: US 12,264,268 B2
(45) Date of Patent: Apr. 1, 2025

(54) OPTICALLY CLEAR ADHESIVES USING SEMI- INTERPENETRATING POLYMER NETWORKS

(71) Applicant: Ares Materials Inc., Dallas, TX (US)

(72) Inventors: Radu Reit, Carrollton, TX (US); Jesus Espinoza Diaz, Dallas, TX (US); Adrian Avendano-Bolivar, Plano, TX (US); Apostolos Voutsas, Dallas, TX (US); David Arreaga-Salas, Garland, TX (US)

(73) Assignee: Ares Materials Inc., Dallas, TX (US)

(*) Notice: Subject to any disclaimer, the term of this patent is extended or adjusted under 35 U.S.C. 154(b) by 0 days.

(21) Appl. No.: 16/756,081

(22) PCT Filed: Oct. 17, 2017

(86) PCT No.: PCT/US2017/057028
§ 371 (c)(1),
(2) Date: Apr. 14, 2020

(87) PCT Pub. No.: WO2019/078829
PCT Pub. Date: Apr. 25, 2019

(65) Prior Publication Data
US 2020/0255709 A1     Aug. 13, 2020

(51) Int. Cl.
*B05D 5/10* (2006.01)
*B05D 5/00* (2006.01)
(Continued)

(52) U.S. Cl.
CPC .............. *C09J 181/04* (2013.01); *B05D 5/00* (2013.01); *B05D 5/10* (2013.01); *B32B 7/12* (2013.01); *C09D 4/00* (2013.01); *C09J 5/06* (2013.01); *B05D 2203/00* (2013.01); *B32B 2457/20* (2013.01)

(58) Field of Classification Search
CPC ......... B05D 5/00; B05D 5/10; B05D 2203/00
See application file for complete search history.

(56) References Cited

U.S. PATENT DOCUMENTS

| | | | |
|---|---|---|---|
| 4,996,101 A * | 2/1991 | Landis | C09J 179/08 428/408 |
| 5,081,198 A * | 1/1992 | Pater | C07D 403/00 526/248 |

(Continued)

OTHER PUBLICATIONS

Voutsas, Novel Polysulfide Substrates for Flexible Electronics, FLEX 2017, Jun. 22, 2017, Monterey, CA.
(Continued)

*Primary Examiner* — Dah-Wei D. Yuan
*Assistant Examiner* — Kristen A Dagenais
(74) *Attorney, Agent, or Firm* — McGuire Woods LLP

(57) ABSTRACT

Provided are semi -interpenetrating optically clear adhesives, methods of use, and methods of manufacture. An example semi-interpenetrating optically clear adhesive comprises a transparent polymer network comprised of at least two or more interpenetrating polymer networks, wherein at least one polymer network is a thermoset material and at least one other polymer network is a thermoplastic material, yielding an optically clear adhesive with a transparency above 80% and an elastic toughness above 1 MJ/m³.

4 Claims, 4 Drawing Sheets

(51) Int. Cl.
  *B32B 7/12*   (2006.01)
  *C09D 4/00*   (2006.01)
  *C09J 5/06*   (2006.01)
  *C09J 181/04* (2006.01)

(56) References Cited

U.S. PATENT DOCUMENTS

| | | | | |
|---|---|---|---|---|
| 5,149,746 | A * | 9/1992 | Pater | C08L 79/08 |
| | | | | 525/422 |
| 7,991,257 | B1 * | 8/2011 | Coleman | G02B 6/0036 |
| | | | | 264/494 |
| 2005/0191507 | A1 | 9/2005 | Yang et al. | |
| 2005/0244975 | A1 * | 11/2005 | Rakow | G01N 25/72 |
| | | | | 436/171 |
| 2007/0036919 | A1 | 2/2007 | Wang et al. | |
| 2008/0107907 | A1 | 5/2008 | Goggio et al. | |
| 2008/0269370 | A1 * | 10/2008 | Myung | A61K 47/60 |
| | | | | 523/105 |
| 2009/0087644 | A1 * | 4/2009 | Supriya | H01L 23/3735 |
| | | | | 428/327 |
| 2015/0318339 | A1 * | 11/2015 | Nakamura | H01L 51/5234 |
| | | | | 257/98 |

OTHER PUBLICATIONS

International Search Report and Written Opinion issued in PCT/US2017/057028, dated Dec. 29, 2017.

\* cited by examiner

OPTICALLY CLEAR ADHESIVES USING SEMI- INTERPENETRATING POLYMER NETWORKS

TECHNICAL FIELD

The present disclosure relates to the use of optically clear adhesives, and, more particularly, to the use of optically clear adhesives comprising at least two or more semi-interpenetrating polymer networks, where at least one polymer network is a thermoset material and at least one other polymer network is a thermoplastic material.

BACKGROUND

Optically Clear Adhesives (hereafter "OCAs") are used to join two parts in a display device. In electronic devices such as mobile products, laptops, television sets and tablets the different components are assembled using optically clear adhesives. Their uses include increasing contrast ratio, increasing ruggedness, and improving battery life by reducing light loss and enabling thinner designs. Another key role is as a buffer layer between two components with dissimilar Young's modulus. As displays move to new dynamic form-factors (e.g., foldable, rollable, etc.), optically clear adhesives may have to enable novel features such as dynamic stress relief and impact resistance.

Current OCAs (e.g., silicones) provide some measure of stress relief in the form of low modulus and high strain materials, however the loose polymer network forming these materials may provide little impact resistance. Traditional optically clear adhesive (OCA) layers have high transmission in the visible range, however, they may have very low elastic toughness (e.g., low crosslink density silicones). Other materials with high elastic toughness exist (e.g., polyether ether ketone ["PEEK"]), however the materials are not transparent and their high modulus does not allow for strain relief between the layers of the display module. Other materials (e.g., epoxy thermosets) may provide a greater degree of impact resistance; however, the elastic toughness values that may be achieved may not prevent damage during high impacts. Additionally, these epoxy-based OCAs may be stiff and reduce the dynamic capacity of a flexible display before a delamination or crack occurs. Therefore it may be beneficial if OCAs for flexible displays are multipurpose materials that are able to accommodate stresses between layers, prevent damage from impacts, and maintain the transparency necessary for materials used in an optical pathway.

BRIEF SUMMARY

Embodiments comprise the use of semi-interpenetrating polymer networks as optically clear adhesive layers with enhanced elastic toughness for use during display device assembly. Disclosed are a set of highly transparent materials (>80% transmission vs. air) that also exhibit a high elastic toughness (>1 MJ/m3). This family of materials comprises good adhesion to glass and other polymers and presents no outgassing.

BRIEF DESCRIPTION OF THE DRAWINGS

Illustrative examples of the present disclosure are described in detail below with reference to the attached drawing figures, which are incorporated by reference herein, and wherein.

Figure 1:
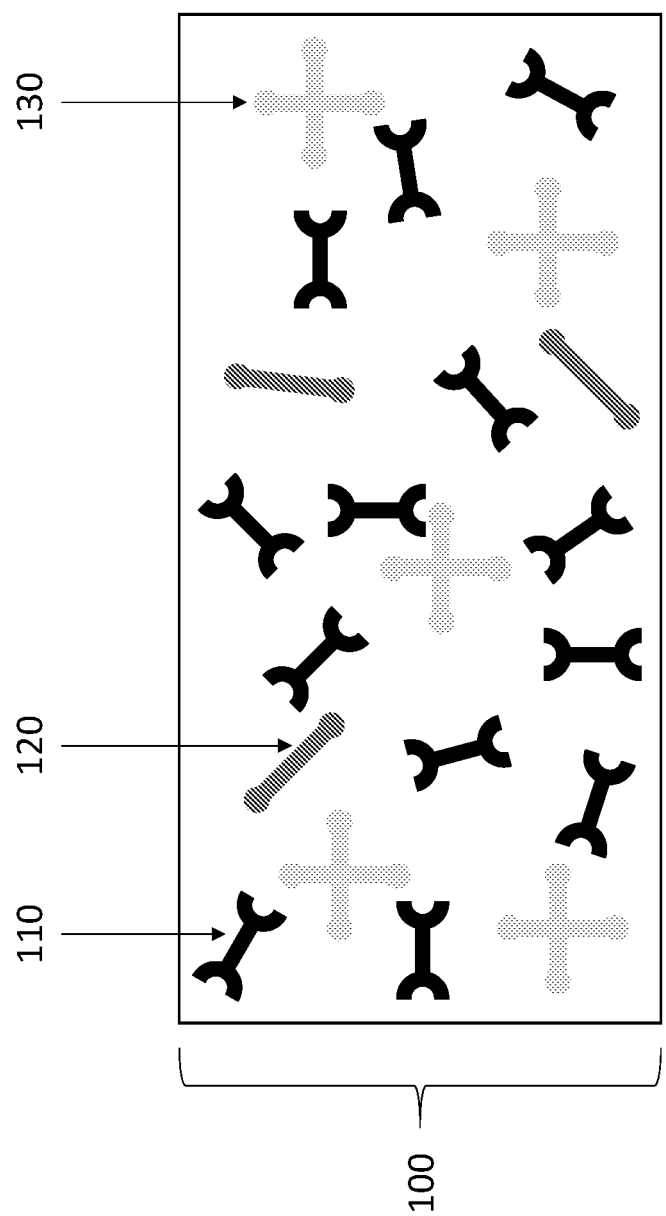
FIG. 1 is a model volumetric unit of a semi-interpenetrating optically clear adhesive monomer mixture, containing multiple monomers that will be cured into a final film that is to be used as an optically clear adhesive in accordance with the embodiments disclosed herein.

The illustrated figures are only exemplary and are not intended to assert or imply any limitation with regard to the environment, architecture, design, or process in which different examples may be implemented.

DETAILED DESCRIPTION

The present disclosure relates to the use of optically clear adhesives, and, more particularly, to the use of semi-interpenetrating optically clear adhesives comprising at least two or more semi-interpenetrating polymer networks (hereafter "SIPN"), where at least one polymer network is a thermoset material and at least one other polymer network is a thermoplastic material.

Methods of using interpenetrating networks as optically clear adhesives with high elastic toughness and high transparency are described. These optically clear adhesives may be used to adhere the different modules that comprise a full display device. These optically clear adhesives may also have a low Young's Modulus (e.g., <100 MPa) in order to serve as buffer layer for mechanical stresses between two layers of a display module. Also, the described OCAs present a high transparency in the visible range (e.g., >80% vs. air). The "transparency" of the material, as used herein, is defined as the ratio of the fluence of visible photons (e.g. those with a wavelength between 400 and 800 nm) through a material before and after introduction of the material in the optical path of a photon source and a photodetector. In embodiments, a thermoplastic network is trapped within a thermoset network to form a semi-interpenetrating network. A semi-interpenetrating network is defined by the International Union of Pure and Applied Chemistry as a polymer comprising one or more networks and one or more linear or branched polymer(s) characterized by the penetration on a molecular scale of at least one of the networks by at least some of the linear or branched macromolecules.

Silicone based OCAs are not considered strong adhesives (i.e., they have an ultimate tensile strength in a range of 200-600 kPa), however their low Young's Modulus and high strain-to-failure are advantageous in preventing stresses from accumulating between multiple stiff layers (e.g., the cover lens and the display module). Epoxy-based OCAs have better adhesion and elastic toughness, but their high modulus (>100 MPa) leads to the transduction of stresses between the layers they adhere. In both cases, the materials may be optically transparent, but they do not show a sufficient shock absorbing capacity. The shock absorbing capacity is the elastic toughness of the material. The elastic toughness of the material, which may be thought of as the total energy dissipated by deformation of the material only within its linear elastic regime (i.e. stress-strain behavior below the yield point of the material), is a critical metric that must be considered if the display module is to survive repeated impacts to the cover lens of the material. For linearly elastic materials, the elastic toughness in MJ/m$^3$ can be approximated by a triangular area approximation using the yield stress in MPa ($\sigma_y$), the strain in mm/mm at the yield stress ($\varepsilon_y$) and the following formula:

$$U_{T,elastic} = \frac{1}{2} * \sigma_y * \varepsilon_y$$

Current materials used as optically clear adhesives may have an elastic toughness value below 1 MJ/m$^3$ due to either a very low yield stress (e.g., silicones with failure stresses below 1 MPa) or a very small strain at the material's yield (e.g., epoxy-based OCAs with yield strains below 5%). With the benefit of this disclosure, one of ordinary skill in the art will be readily able to build an optically clear adhesive having intermittent failure stresses (>1 MPa) observed at intermediate elongations (>50%) and yielding elastic toughness values above 1 MJ/m$^3$.

FIG. 1 is a model volumetric unit 100 of a semi-interpenetrating optically clear adhesive monomer mixture, containing multiple monomers 110, 120, and 130 that may be cured into a final film that is to be used as an optically clear adhesive.

Figure 2:
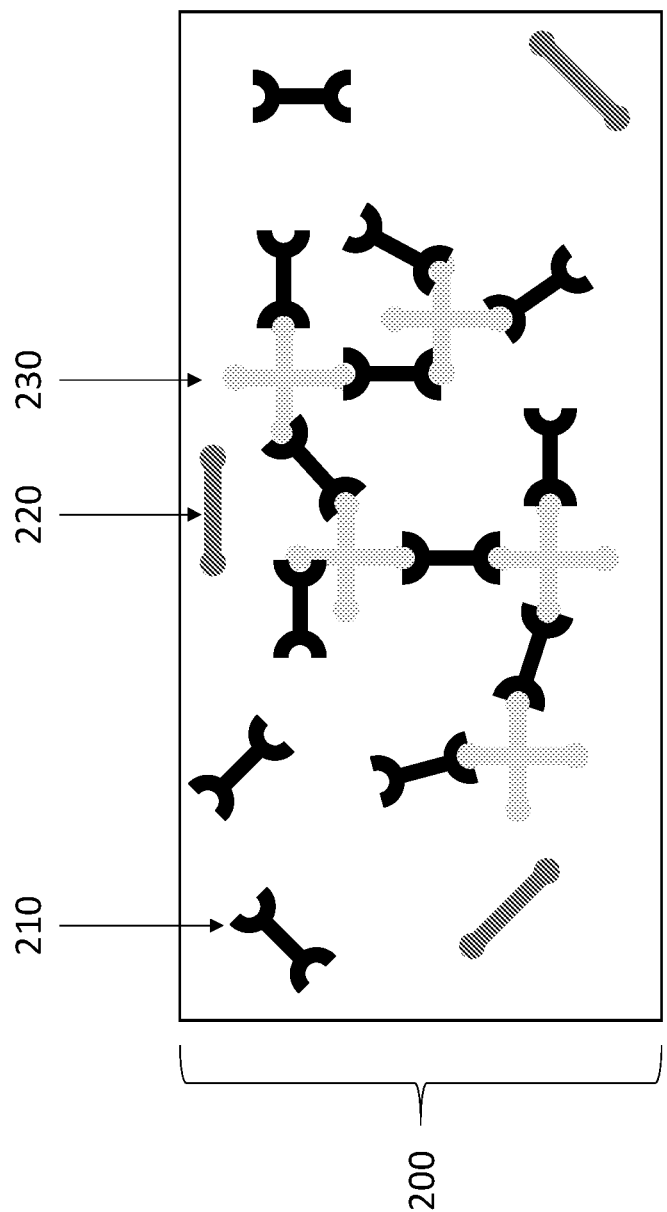
FIG. 2 is a model volumetric unit of a semi-interpenetrating optically clear adhesive film cured from an optically clear adhesive monomer mixture, where one set of monomers have been reacted to form a thermoset network while leaving remaining monomers trapped within this network in accordance with the embodiments disclosed herein.

FIG. 2 is a model volumetric unit of a semi-interpenetrating optically clear adhesive film 200 cured from an optically clear adhesive monomer mixture, where one set of monomers 230 have been reacted to form a thermoset network while leaving remaining monomers 210, 220 trapped within this network.

Figure 3:
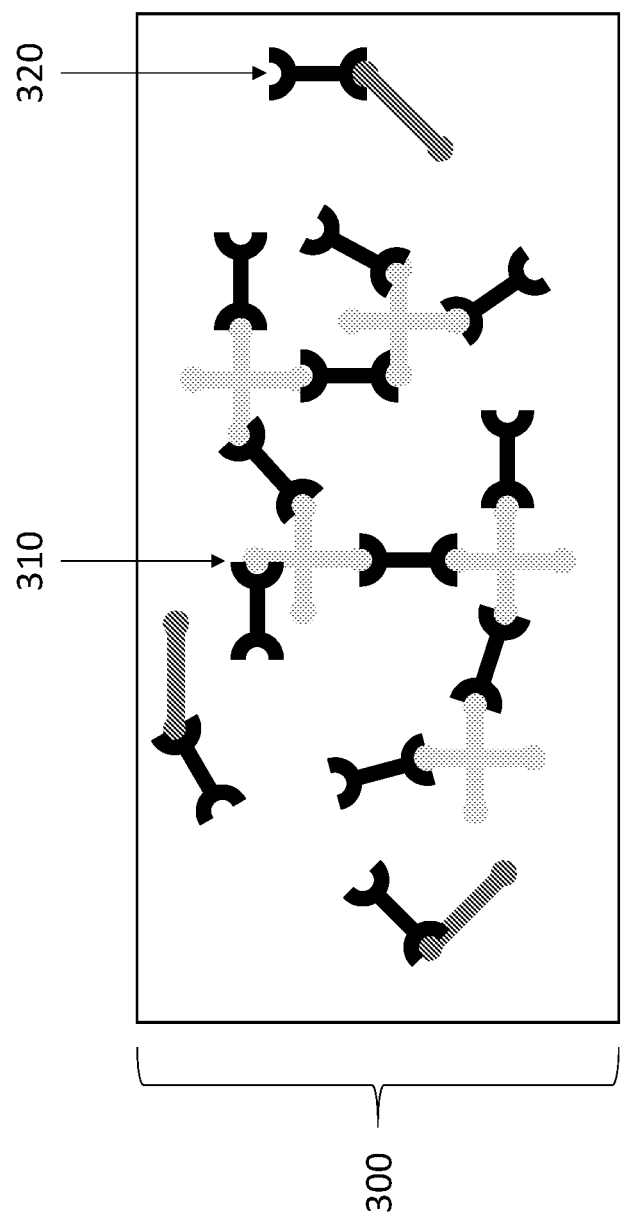
FIG. 3 is a model volumetric unit of a semi-interpenetrating optically clear adhesive film cured from an optically clear adhesive monomer mixture, where one set of monomers have been reacted to form a thermoset network and another set of monomers have been reacted to form a thermoplastic network trapped within the thermoset network in accordance with the embodiments disclosed herein.

FIG. 3 is a model volumetric unit of a semi-interpenetrating optically clear adhesive film 300 cured from an optically clear adhesive monomer mixture, where one set of monomers have been reacted to form a thermoset network 310 and another set of monomers have been reacted to form a thermoplastic network 320 trapped within the thermoset network.

Figure 4:
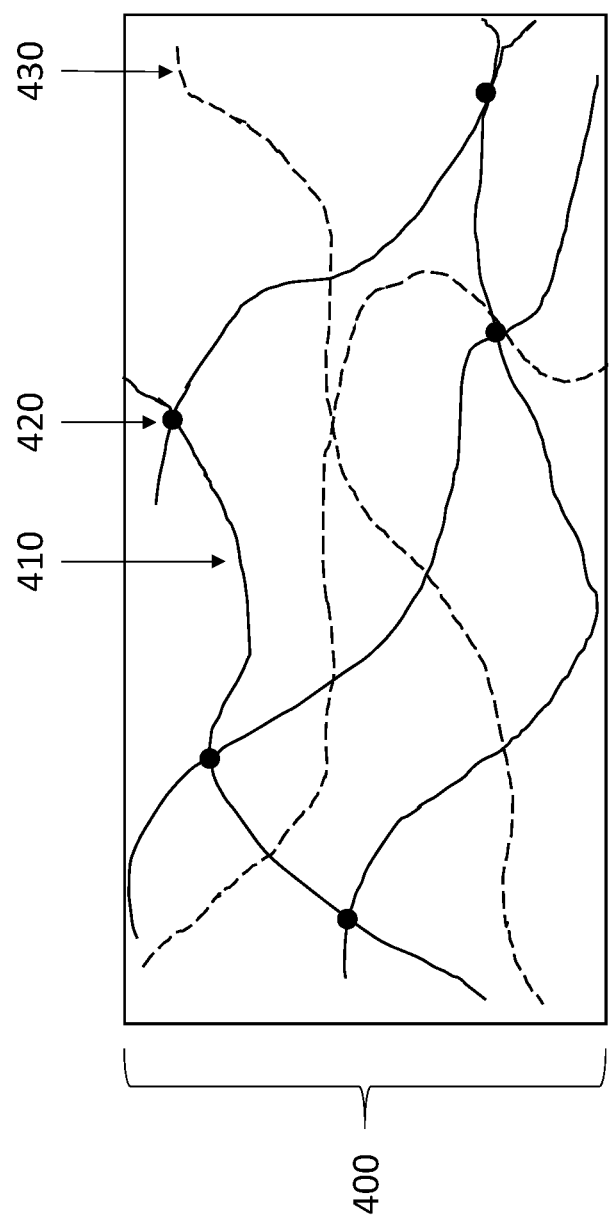
FIG. 4 is a model volumetric unit of a semi-interpenetrating optically clear adhesive film, where a thermoset network has been filled with a thermoplastic have been reacted to form a thermoplastic network trapped within the thermoset network in accordance with the embodiments disclosed herein.

FIG. 4 is a model volumetric unit of a semi-interpenetrating optically clear adhesive film 400, where a thermoset network 410 has trapped the thermoplastic network to form a SIPN.

In some embodiments, the optically clear adhesive comprises a transparent thermoset comprising a network of polysulfide thermoset polymers.

In embodiments, the semi-interpenetrating optically clear adhesive comprises a network of transparent thermoplastic polymers. Examples of transparent thermoplastic polymers may include, but are not limited to, a polyacrylic, a polycarbonate, a polyurethane, a polycarbonate, a polyimide, a polyamide, a polyester, a polyetherimide, a polyamideimide, a cyclic olefin copolymer, a polybenzimidazole, a polythioether, a polyether sulfone, a polyoxymethylene, a polyolefin, a polyarylene sulfide, a polyarylene ether ketone, or a combination thereof.

The thermoplastic polymers may be polymerized from thermoplastic-forming monomers. Examples of thermoplastic-forming monomers include, but are not limited to, isocyanates, thiocyanates, alcohols, amines, thiols, epoxides, alkenes, alkynes, anhydrides, azides, carboxyls, alkyl halides, aryl halides, acyl halides, nitriles and nitro compounds. It is to be understood that the thermoplastic-forming monomers chosen from the general classes above will produce linear polymers after polymerization. With the benefit of this disclosure, one of ordinary skill in the art will be able to readily select a monomer mixture that yields a thermoplastic network of transparent thermoplastic polymers.

In some embodiments, the semi-interpenetrating optically clear adhesive comprises a network of thermoplastic polymers polymerized from a monomer mixture added to a formed thermoset network.

In some embodiments, the semi-interpenetrating optically clear adhesive was formed from a monomer mixture that can undergo two orthogonal reactions to form one or more thermoset networks, and after which another reaction to form one or more thermoplastic networks.

In embodiments, the semi-interpenetrating optically clear adhesive comprises a network of transparent thermoset polymers that are semi-interpenetrated by a network of thermoplastic polymers. The thermoset polymers may be polymerized from a monomer mixture of thermoset-forming monomers. The thermoset-forming monomers include multifunctional thiol monomers and one or more multifunctional comonomers. The multifunctional thiol monomers may include, but are not limited to, trimethylolpropane tris(3-mercaptopropionate); trimethylolpropane tris(2-mercaptoacetate); pentaerythritol tetrakis(2-mercaptoacetate); pentaerythritol tetrakis(3-mercaptoproprionate); 2,2'-(ethylenedioxy)diethanethiol; 1,3-propanedithiol; 1,2-ethanedithiol; 1,4-butanedithiol; tris[2-(3-mercaptopropionyloxy)ethyl] i socyanurate; 3,4-ethylenedioxythiophene; 1,10-decanedithiol; tricyclo[5.2.1.02,6] decanedithiol ; benzene-1,2-dithiol; trithiocyanuric acid; dipentaerythritol hexakis(3-mercaptopropionate); 2,3-di((2-mercaptoethyl)thio)-1-propanethiol; dimercaptodiethyl sulfide; ethoxylated trimethyl propan-tri (3-mercapto-propionate); ethoxylated trimethylpropantri(3-mercapto-propionate); polycaprolactone tetra 3-mercaptopropionate; di-Pentaerythritolhexakis (3-mercaptopropionate); di-Trimethylolpropanetetra (3-mercaptopropionate); glycol di(3-mercaptopropionate); pentaerythritoltetramercaptoacetate; trimethylol-propanetrimercaptoacetate; and glycoldi-mercaptoacetate; any derivatives thereof; or any combination thereof.

The multifunctional comonomers may include, but are not limited to, 1,3,5-triallyl-1,3,5-triazine-2,4,6 (1H,3H,5H)-trione; tricyclo[5.2.1.02,6] decanedimethanol diacrylate; divinyl benzene; diallyl adipate; diallyl bisphenol A (diacetate ether); diallyl terephthalate; diallyl phthalate; diallyl maleate; trimethylolpropane diallyl ether; ethylene glycol dicyclopentenyl ether acrylate; diallyl carbonate; diallyl urea; 1,6-hexanediol diacrylate; cinnamyl cinnamate; vinyl cinnamate; allyl cinnamate; allyl acrylate; crotyl acrylate; cinnamyl methacrylate; trivinylcyclohexane; 1,4-cyclohexanedimethanol divinyl ether; poly(ethylene glycol) diacrylate; tricyclodecane dim ethanol diacrylate; bisphenol A ethoxylate diarylate; tris[2-(acryloyloxy ethyl)] isocyanurate; trimethylolpropane triacrylate; pentaethrytolpropane tetraacrylate; dipentaethrytolpropane penta-/hexa-acrylate; poly(ethylene glycol) dimethacrylate; dimethanol dimethacrylate; bisphenol A ethoxylate dimetharylate; trimethylolpropane trimethacrylate; pentaethrytolpropane tetramethacrylate; bisphenol A diglycidyl Ether; neopentyl glycol diglycidyl ether; tris(2,3-epoxypropyl) isocyanurate; trimethylolpropane triglycidyl ether i. 1,1'-(methylenedi-4,1-phenylene) bismaleimide; 1,6-di(maleimido)hexane; 1,4-di (maleimido)butane; N,N'-(1,3 phenylene) dimaleimide;

isophorone diisocyanate; xylylene diisocyanate; tolylene diisocyanate; 1,4-diisocyanatobutane, 1,6-diisocyanatohexane, 1,8-diisocyanatooctane; vinyl norbornene; dicyclopentadiene; ethylidene norbornene; 1,3-bis(2-isocyanato-2-propyl)benzene; 2,2-bis(4-isocyanatophenyl) hexafluoropropane; 1,3-bis(isocyanatomethyl)cyclohexane; methylenediphenyl 4,4'-Diisocyanate; 3,3'-dichloro-4,4'-diisocyanatobiphenyl; 4,4'-diisocyanato-3,3'-dimethylbiphenyl; dicyclohexylmethane 4,4'-diisocyanate; 1,5-diisocyanatonaphthalene; 1,3-phenylenesiisocyanate; 1,4-phenylene diisocyanate; dimers thereof; trimers thereof; any derivatives thereof; or any combination thereof. It is to be understood that the multifunctional thiol monomer(s) and the multifunctional comonomer(s) are selected to form a resin which yields a transparent polymer once cured. As such, transparency of the multifunctional thiol monomer(s) and the multifunctional comonomer(s) or the mixtures of the multifunctional thiol monomer(s) and the multifunctional comonomer(s) are not a factor for selection provided the produced polymer is of sufficient transparency. With the benefit of this disclosure, one of ordinary skill in the art will be able to readily select a multifunctional thiol monomer(s) and the multifunctional comonomer(s) to yield a transparent polymer when cured.

In some embodiments the multifunctional thiol(s) and multifunctional comonomer(s) are added in off-stoichiometric ratios in order to present excess functionality of either the thiol(s) and/or the comonomer(s)

In some embodiments, a thermoset OCA is soaked in a monomer mixture of thermoplastic-forming monomers to form the semi-interpenetrating optically clear adhesive. The monomer mixture may be allowed to diffuse into the thermoset OCA via a soaking step. In some embodiments, the soaking may be a batch process such as package soaking where the thermoset OCA is soaked in a pressurized tank containing the thermoplastic monomer mixture. In other embodiments, the soaking may be a batch process such as jig soaking where a roll of the thermoset OCA is repeatedly wound and unwound between two rollers, passing through the thermoplastic monomer mixture. In other embodiments, the soaking may be a batch process such as jet soaking where the thermoset OCA is circulated in a closed tube through a jet of pressurized thermoplastic monomer mixture. In alternative embodiments, the soaking may be a continuous process including an unwind step, soaking step, curing step, washing step, and rewind step. In further alternative embodiments, the soaking may be a semi-continuous process which may include steps from both batch processes and continuous processes for the application of multiple thermoplastic-forming monomer mixtures.

EXAMPLES

The present disclosure can be better understood by reference to the following examples, which are offered by way of illustration. The present disclosure is not limited to the examples given herein.

Example 1

A semi-interpenetrating optically clear adhesive monomer mixture is prepared by adding 47.2 g 2,2'-(ethylenedioxy) diethanethiol, 43.5 g Trimethylolpropane triglycidyl ether, 9.25 g trimethylolpropane diallyl ether, 1.0 g 2,2-Dimethoxy-2-phenylacetophenone and 1.0 g triethylamine in a container. The solution is then mixed using a planetary mixer at 2350 RPM for 1 minute to homogenize the monomer mixture. Next, the monomer mixture is dispensed atop a display module and a cover lens is laminated atop the liquid monomer mixture. The stack is then cured at 80° C. for 60 minutes to form the polysulfide thermoset network. Next, the stack is placed under a UV lamp and exposed to 1 J/cm$^2$ of 365 nm light to form the polysulfide thermoplastic network. All curing is performed under ambient atmospheres, with no need for vacuum, dry or inert atmospheres.

Example 2

A thermoplastic solution is prepared by dissolving 10 g of poly(methyl methacrylate) (PMMA) into 90 g acetone. Next, a crosslinked silicone optically clear adhesive film is soaked in the solution while stirring for 60 minutes, allowing the PMMA chains to diffuse into the silicone OCA. The silicone OCA is then removed from the thermoplastic solution and baked at 100° C. for 60 minutes to remove any remaining acetone from the film, leaving behind a semi-interpenetrating optically clear adhesive. The film is then applied atop a display module and a cover lens is then applied atop the silicone film. An optional degassing step is performed (60 minutes, <100 mTorr) to remove any trapped gasses between the cover lens, OCA film and display module.

Example 3

A semi-interpenetrating optically clear adhesive monomer mixture is prepared by adding 52.3 g 2,2'-(ethylenedioxy) diethanethiol, 47.7 g triallyl isocyanurate, and 1.0 g 2,2-Dimethoxy-2-phenylacetophenone in a container. The solution is then mixed using a planetary mixer at 2350 RPM for 1 minute to homogenize the monomer mixture. Next, 10 g of poly(methyl methacrylate) (PMMA) is added to the solution and the solution is again mixed using a planetary mixer at 2350 RPM for 1 minute. The monomer mixture is dispensed atop a display module and a cover lens is laminated atop the liquid monomer mixture. Next, the stack is placed under a UV lamp and exposed to 1 J/cm$^2$ of 365 nm light to form the polysulfide thermoset network, containing PMMA chains entangled in the network. All curing is performed under ambient atmospheres, with no need for vacuum, dry or inert atmospheres.

What is claimed is:
1. A method of manufacturing a semi-interpenetrating optically clear adhesive comprising:
   providing a monomer mixture comprising thermoplastic-forming monomers and thermoset-forming monomers, the thermoset-forming monomers comprising one or more multifunctional thiol(s) and one or more multifunctional comonomer(s), the one or more multifunctional thiol(s) and the one or more mult fun ctional comonomen(s) provided in off-stoichiometric ratios;
   dispensing the monomer mixture on a display module;
   curing the thermoset-forming monomers to form a thermoset network of polysulfide thermoset polymers;
   curing the thermoplastic-forming monomers to form a thermoplastic network;
   wherein the curing the thermoplastic-forming monomers is performed after the curing of the thermoset-forming monomers;
   wherein the thermoplastic network semi-interpenetrates the thermoset network to produce the semi-interpenetrating optically clear adhesive where the optically clear adhesive comprises a Young's Modulus less than 100 MPa in order to serve as a buffer layer for mechanical stresses between two layers of the display module.

2. The method of claim 1, wherein the monomer mixture undergoes two orthogonal reactions to form one or more thermoset networks, and after which another reaction to form one or more thermoplastic networks.

3. The method of claim 1, wherein the monomer mixture comprises one or more thermoplastic polymers solvated into the liquid monomer mixture.

4. The method of claim 1, wherein the monomer mixture is dispensed directly between a display module and a cover lens.

\* \* \* \* \*